Dec. 18, 1928.
J. B. WHITMORE
1,695,834
MACHINE FOR MANUFACTURING STEMS FOR TIPLESS LAMPS
Filed April 9, 1924 3 Sheets-Sheet 1
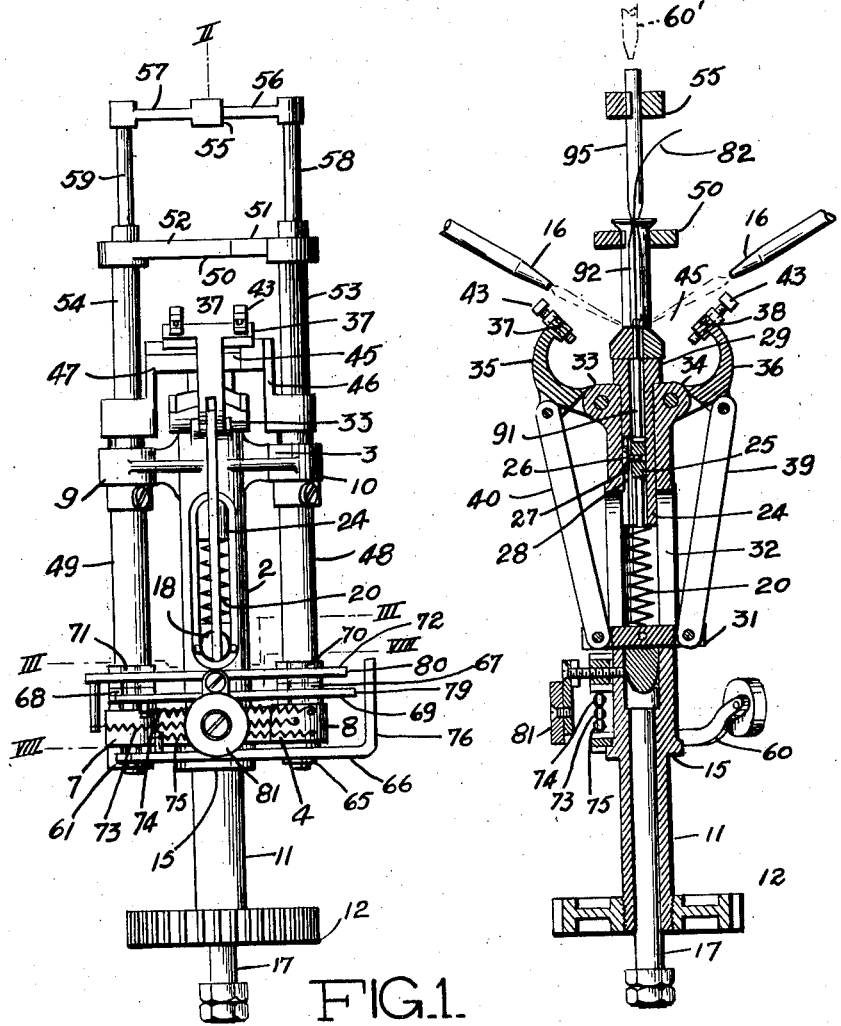
FIG.2.
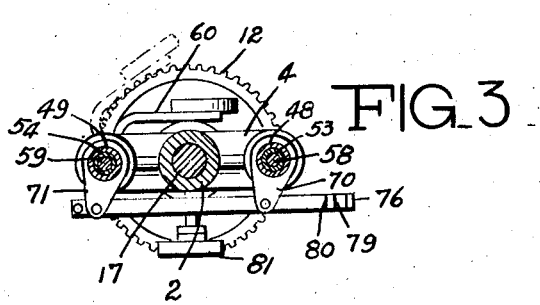
FIG.3.
INVENTOR
JAMES B WHITMORE
BY 
ATTORNEY Dec. 18, 1928.  1,695,834
J. B. WHITMORE
MACHINE FOR MANUFACTURING STEMS FOR TIPLESS LAMPS
Filed April 9, 1924   3 Sheets-Sheet 2

INVENTOR
JAMES B. WHITMORE
BY
ATTORNEY

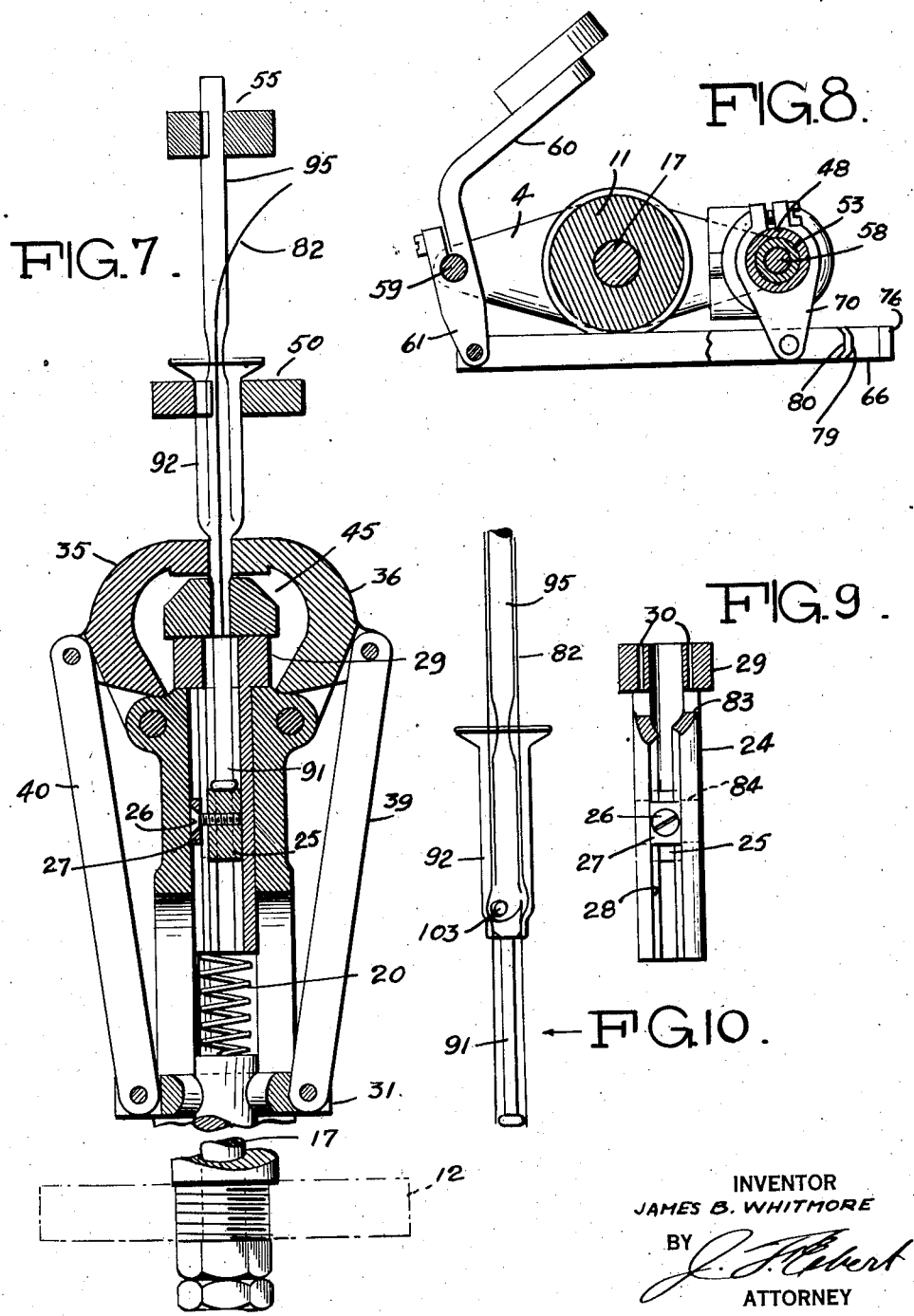

Patented Dec. 18, 1928.

1,695,834

UNITED STATES PATENT OFFICE.

JAMES BRYANT WHITMORE, OF BLOOMFIELD, NEW JERSEY, ASSIGNOR TO WESTINGHOUSE LAMP COMPANY, A CORPORATION OF PENNSYLVANIA.

MACHINE FOR MANUFACTURING STEMS FOR TIPLESS LAMPS.

Application filed April 9, 1924. Serial No. 705,322.

This application is a continuation of copending application of James B. Whitmore and John E. Ferguson, Serial No. 442,219, filed February 3, 1921, now Patent #1,547,478 machine for manufacturing stems for tipless lamps (W L 25) and assigned to the Westinghouse Lamp Company.

The present invention relates to machines in which work parts may be assembled and consolidated to form stems for incandescent lamps. The mechanism contemplated by my invention is particularly adapted for the manufacture of stems of the type used in making tipless lamps, such stems embodying a tube for exhaust purposes.

The present invention, has for one of its objects, the provision of a stem head comprising work-holding members which may consist of a plurality of sets of jaws adapted to operate in a sequence of the order required for the assembly of the work parts, the several supporting members being controlled by a single actuating lever.

Another object of the invention is the provision of a plurality of pairs of work-holding members, each pair being readily adjustable to vary their spaced relation to accommodate work parts of different lengths.

Other objects of the invention have to do with various features of construction and arrangement of parts which will manifest themselves upon a reading of the following description.

Figure 4:
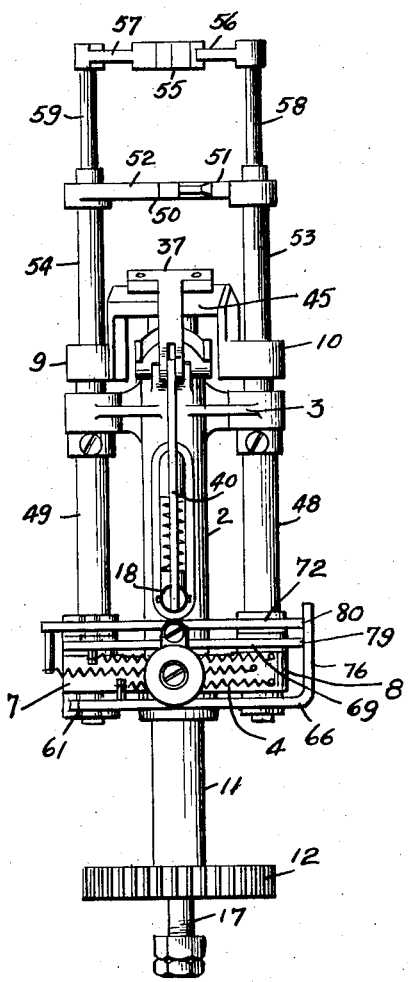
Figure 6:
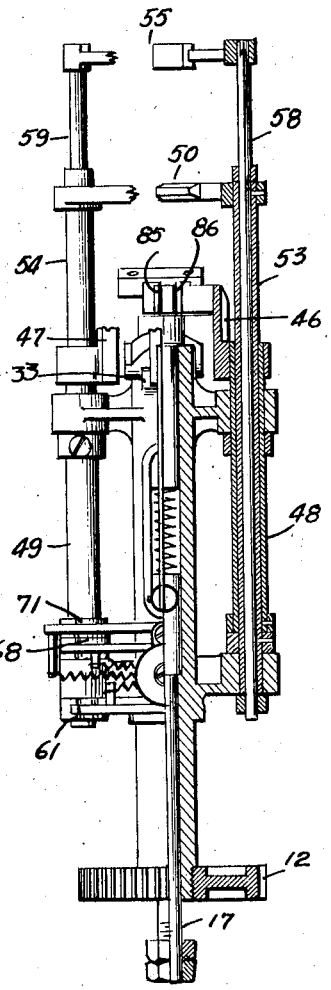
Figure 5:
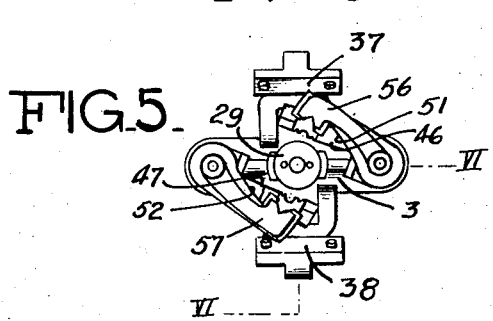

In the accompanying drawings, Fig. 1 is a front elevation of my stem-head or stem-forming mechanism; Fig. 2 is a vertical section of the head taken on line II—II in Fig. 1; Fig. 3 is a transverse section, taken on line III—III in Fig. 2; Fig. 4 is a front elevation of the head showing the jaws open to receive the work blanks which form the stem; Fig. 5 is a top plan view of Fig. 4; Fig. 6 is a front elevation of the head, partly in section, taken on line VI—VI of Fig. 5; Fig. 7 is an enlarged view of a portion of the head, partly in section, showing all of the jaws closed; Fig. 8 is an enlarged transverse cross-section of the head taken on line VIII—VIII in Fig. 1; Fig. 9 is a detail of one of the parts of the head, shown partly in section, and Fig. 10 is an elevation of a complete lamp stem provided with an exhaust tube.

Generally speaking, machines of the type to which this invention relates may comprise in the main, a central hub rotatably mounted upon a base and provided with a circular plate or carriage rigidly secured to the hub and having a plurality of bearings disposed near its periphery in which are mounted a corresponding number of work-holding devices or heads for supporting several work blanks, including a so-called exhaust tube. Means may be provided for revolving the carriage step by step, the heads being rotatable independently of the carriage which is indexed to move a given distance at each step, and the heads being adapted to connect with driving mechanism and rotate constantly during the stages in which the carriage is stationary. The work-holding heads carried in the outer bearings of the machine hold and rotate work-blanks in the path of a suitable flame located at given stages and designed to make the glass parts plastic, press-forming jaws being then actuated to compress the plastic portion and consolidate the blanks so that, in the final operation or completion of a given cycle, a mount or stem is formed.

Most of the apparatus just described is not of my invention and, consequently, is not illustrated or described in detail, as my invention resides in the improvement of the work-holding devices mentioned above, whereby the several parts which form the stem may be supported in vertical alignment and the said jaws may be operated either in the proper sequence to receive the work or in rapid succession to release the work.

Referring to the accompanying drawings, the head includes a standard or post 2 having upper and lower cross arms 3 and 4, respectively. The lower arms are provided with bearings 7 and 8, and the upper arms with bearings 9 and 10. Integral with the post, and at the lower end thereof, is a stem or hollow shaft 11 which may be journaled in a suitable bearing of a carriage common to machines of this class. A shoulder 15 at the upper end of the stem affords a bearing surface for the rotatable head.

The stem 11 projects below the carriage and is equipped with a gear wheel 12 which is arranged to mesh with suitable opposing teeth to effect the rotation of the head at the required stages. The carriage is adapted to convey the gear 12 to a driving position and then away from the same when a given period of time has elapsed. The heads are rotated during the periods when the carriage is stationary and heat is being applied to the work by suitably located burners 16.

Within the post 2 and continuous with the hollow portion of the stem 11, is a counter bore, and, located within the stem 11, is a movable rod 17 connected to a cross-head 18 which is reciprocated within the bore of the post 2 by a movement of said rod. A cam or other means (not shown) is provided for moving the rod 17 at the proper stages during a revolution of the carriage, for purposes to be presently explained.

The downward movement of the cross-head 18 is limited by a suitable shoulder or ledge within the hollow portion of the stem 11. The rod 17 and cross-head 18 are normally retained in their lower positions by a helical spring 20 disposed between the cross-head and a tubular member or split-sleeve 24 fixed in the upper portion of the post 2. This tubular member serves as an adjustable arbor holder. A variety of lengths of arbors may be supported in the sleeve 24 which is provided with an adjustable stop 25 to increase or decrease the depth of the tubular aperture in which the arbor is located when the work parts are assembled. The stop may be adjusted by means of a screw 26 (see Fig. 9) which holds a small friction plate 27 against the edges 28 of a slot at one side of the member 24. The said tubular member may be machined with a collar 29 which rests upon the upper end of the post 2 and is provided with pockets 30 to receive the ends of lead-in wires.

Lugs 33 and 34 are located on opposite sides of the upper portion of the post 2 to provide bearings for arms 35 and 36 which carry press-forming jaws 37 and 38. Slots 32, disposed at opposite sides of the post, permit the vertical movement of the cross-head 18 which is provided with projecting portions or bearing 31. The arms 35 and 36 are connected to the bearings 31 by links 39 and 40, and the reciprocation of the rod 17, therefore, effects an actuation of the press-forming jaws 37 and 38, which close upon and impress the work. The desired spacing of the said jaws, when closed, is maintained by means of the adjustment of set-screws 43.

The head may be provided with a plurality of pairs of work-holding clamps consisting of arbor-supporting jaws 45 positioned upon arms 46 and 47 secured to the upper ends of tubular outer-shafts 48 and 49; intermediate flare-supporting jaws 50 at the free ends of arms 51 and 52 carried at the upper ends of tubular shafts 53 and 54 and upper exhaust-tube-holding jaws 55 at the free ends of arms 56 and 57 extending from the upper ends of the spindles 58 and 59. The said spindles and shafts are supported by, and are rotatable in, bearings 7, 8, 9 and 10 of the gross arms 3 and 4. The above mentioned arms carrying the three sets of jaws are adapted to swing in arcs in horizontal planes and it is important that the pairs of jaws 45, 50 and 55 shall be in vertical alignment to hold the various parts to be consolidated, on a common axial line.

An actuating lever 60, provided with a suitable finger-piece and a short arm, 61 (see Fig. 8), is secured to the lower end of the spindle 59, and spindle 58 is provided with a split collar 65 (see Fig. 1) and has a projecting arm similar to the arm 61. The arm 61 of the actuating lever 60 and the arm of collar 65 may be connected by a link 66 whereby the operation of the lever 60 causes a rotative movement of the two rods 58 and 59 to open and close the jaws attached thereto.

The shafts 53 and 54, which carry the intermediate jaws, are provided with split collars having arms 67 and 68 connected by a link 69. Shafts 48 and 49, which carry the lower jaws 45, are provided with split collars having arms 70 and 71 connected by a link 72. The jaws 45, 50 and 55 are held normally closed by means of springs 73, 74 and 75, respectively, each of which has one end secured to the stationary cross-arm and the opposite end connected to the respective links in such a manner as to tensionally hold the jaws closed.

For the purpose of operating the upper, lower, and intermediate jaws 45, 50 and 55, either in close sequence or substantially simultaneously, a contact arm 76 is provided and may be integral with the link 66. The arm 76 is arranged to move toward the ends of the links 69 and 72 to engage therewith as the lever 60 is actuated. The desired sequential or progressive actuation of the several sets of jaws may be attained by providing the links 69 and 72 of different lengths. The links may be so arranged that the free ends 79 and 80 thereof may be disposed in different vertical planes so that when the contact arm 76 is moved it will engage the links successively.

An initial movement of the lever 60 will thus cause the upper jaws 55 to open. A continued movement will cause the arm 76 to make contact with the link 69 to effect the opening of jaws 50, and a further continued movement of the arm will cause the jaws 45 to open. A button 81, provided on the side of the post 2 opposite to the finger piece of the actuating lever 60, is so positioned as to afford a grip for the operator when manipulating the said lever.

In order to more readily conduct lead-in wires 82 of the stem (as shown in Fig. 10) to the wells or pockets 30, a pair of supplemental guides or pockets are provided, consisting of vertical grooves 85 and 86 on the faces of the opposite jaws 45 (see Fig. 6) and so disposed, that when the jaws are in a closed position, the grooves will form continuations of the pockets 30. When the lead-in wires are applied to the blanks in the assembly of the stem parts, they pass through the grooves 85 and 86 constituting passages between the closed jaws 45, and into the pockets or wells 30 and can be stopped either by surfaces 83 provided in the member 24 or slots may be provided to permit a movement of lugs 84 on opposite sides of the vertically adjustable stop 25 to receive the ends of the lead-wires.

The sleeves and spindles are adapted for vertical adjustment and the vertical distance between the work-holding clamps may thus be varied to accommodate work parts of different lengths. If for instance, it is desirable to change the distance between a pair of clamps, the split collars at the lower end of the sleeves of spindles are loosened and the said sleeves or spindles may be moved up or down to adjust the clamps in given relative position.

The split collars as provided at the ends of the spindles and hollow shafts also serve as a means for varying the operative relation of the jaws. For example, if it is desired to have the flare holding jaws 50 open a given distance before the contact arm 76 causes the arbor holding jaws to be actuated, the split collars at the ends of the hollow shafts 53 and 54 may be loosened in the usual manner and the arms 67 and 68 adjusted, thus changing the position of the end 79 of the link 76 with respect to the end 80 of the link 72.

The collars may then be tightened and as will be evident, the relative movement of the several sets of jaws will be changed. By reason of the split collars, it is possible, therefore, to adjust the links from time to time as may be found necessary to maintain the jaws in alignment. It is also possible to change the relation of movement of the jaws by filing away portions of the ends 79 or 80 of the links thus changing the distance between the said ends and the contact arm 76 to vary the order of sequence of operation of the several pairs of jaws.

In the operation of the stem-making machines, as contemplated by the present invention, the operator presses the finger piece of the actuating lever 60 to cause all of the jaws to open. An arbor or glass rod 91 is then inserted in the holder 24 and supported in its proper position by means of the adjustable stop 25, set to accommodate a given arbor length. Upon releasing the finger piece, the jaws 45 close and grip the arbor to support it vertically in the head. The finger piece is again moved to bring the contact arm 76 in contact with the end 79 of the link 69, thus causing a movement of the link and the actuation of the jaws 50. A flare-tube 92 is then placed over the exposed end of the arbor, with its smaller end resting upon the jaws 45. The release of the finger piece permits the jaws 50 to close and grip the said flare tube. Lead-in wires 82 are then inserted into the flare tube, their ends being guided into the pockets as provided.

To apply an exhaust tube 95, it is then simply necessary to move the actuating lever 60 a relatively short distance to cause the jaws 55 to open sufficiently for the admission of the exhaust tube. When an exhaust tube has been arranged in position, the release of the lever permits the said jaws to close to grip the tube and support it vertically in the head. It will, therefore, be understood that an exhaust tube may be inserted and held in its proper relation to the flare tube and arbor and that all the parts will be held in vertical alignment, and, furthermore, it is, by virtue of the present construction, possible for the operator to apply an exhaust tube to the head without disturbing the previously assembled parts.

The parts are thus more easily assembled and may be accurately arranged on a common axial line, which is necessary to obtain a good product. When the parts have been assembled and secured on a common axial line by their respective pairs of jaws, heat is applied locally to the blanks to render plastic certain portions thereof. Any desirable form of heating element may be employed for heating the assembled glass portions of the stem. These parts are assembled so that their ends are concentrically disposed for the application of heat. The burners 16, as shown in Fig. 2, may be properly positioned to direct flames upon the work. The burners may be disposed adjacent the path of movement of the heads so that when a head is in a given position the flames will be caused to impinge upon the work to render a portion thereof plastic After the glass stem parts have been rendered sufficiently plastic, suitable mechanism effects an upward movement of the rod 17 and the press-forming jaws 37 and 38 are operated to compress the plastic portion and thus consolidate the several work parts to form a lamp stem.

The tube, which is provided for exhaust purposes, having thus been combined with the arbor and flare, it becomes necessary to form an aperture near the end thereof to afford a communication (after the stem has been sealed into a bulb) between the interior of the bulb and the exhaust equipment. This may be accomplished by maintaining the lower portion of the flare tube and the exhaust tube in a plastic condition by means of heat. These tubes are thus caused to unite and form a single wall. The end of the arbor disposed within the flare tube is also rendered plastic and unites with the other glass parts. A current of air under pressure may then be directed down the exhaust tube to puncture the incandescent wall at the union of the tubes to form an aperture 103 as shown in Fig. 10. Any suitable means may be employed for puncturing the wall and, as shown in Fig. 2, an air pressure line 60' may be so located that when the stem head is disposed in a given position, a stream of air will pass down the exhaust tube and a puncture in the incandescent wall result.

Means for forming the aperture 103 and the mechanism to effect the consolidation of the several pieces of work may be of any well known design for use in conjunction with my invention which may be said to consist principally in the provision of a stem-head provided with several pairs of jaws which may be operated independently or in sequence by means of a single actuating lever, the same also being arranged to open the jaws in rapid succession.

In quantity production of articles of this character, elimination of unnecessary manual movements is an important factor. My stem head has been constructed particularly with this end in view, and the order in which I have described the assembly of the component parts of the stem has been found, in practice, to greatly aid in attaining a maximum rate of production.

Although I have shown and described my machine for use in the manufacture of stems for tipless lamps, it is obvious that it may be utilized for the production of stems in which no exhaust tube is consolidated with other work parts.

It will be seen that the machine of this invention combines, in a convenient and simple structure, elements by means of which the features for rapidly producing lamp stems may be obtained without the exercise of any particular skill on the part of the operator.

What is claimed is:

1. In an apparatus for the manufacture of incandescent lamp stems, the combination of a pair of arbor holding jaws, a pair of flare-holding jaws, an adjustable member to temporarily support an arbor, a member having pockets to receive the ends of lead-in wires, oppositely disposed grooves on the arbor-holding jaws arranged to provide continuations of said pockets when the jaws are closed and means for heating and consolidating said parts to form a lamp stem.

2. In an apparatus for the manufacture of incandescent lamp stems, the combination of a pair of arbor-holding jaws, a pair of flare-holding jaws, a temporary support for the arbor, the faces of the arbor-holding jaws having oppositely disposed grooves whereby the jaws, when closed, provide pockets to receive the ends of lead wires, and means for consolidating the work-parts to form a stem.

3. In an apparatus for the manufacture of incandescent lamp stems, the combination of a pair of arbor-holding jaws, a pair of flare-holding jaws, an adjustable arbor-supporting member, split pockets to receive lead wires upon the faces of the arbor-holding jaws having oppositely disposed vertical grooves arranged to form the above mentioned split pockets when the said jaws are closed about the arbor, and means for heating and consolidating the work parts.

4. A machine for assembling and consolidating a plurality of glass parts to form a stem, the combination of upper, lower, and intermediate jaws, one pair of the said jaws having grooves disposed upon the opposing faces thereof, said grooves being arranged to form supplemental pockets for lead wires when said jaws are in a closed position, said upper jaws being connected to the upper ends of spindles, the intermediate jaws being connected to the uper ends of shafts movable about said spindles and the lower jaws being connected to outer-shafts movable about the above mentioned shafts, means for applying heat to a portion of the said parts and means for compressing the said heated portion to consolidate the said parts.

5. In a machine for assembling and consolidating a plurality of glass parts to form a stem for incandescent lamps, the combination of upper, lower, and intermediate pairs of clamps, the opposing jaws of each of the said clamps being arranged to swing on independent axes, one of the said axes being common to one of the jaws of each of the clamps and the other axis being common to the opposite jaws of each of the clamps, means positioned between said axes for holding glass parts, means for applying heat to a portion of said glass parts when supported by the clamps and means for compressing the said heated portion to unite the said parts.

6. In a machine for assembling and consolidating a plurality of glass parts to form a stem for incandescent lamps, the combination of upper, lower, and intermediate pairs of clamps, the corresponding opposing jaws of each pair of the said clamps being arranged to swing on independent axes, one of the said axes being common to one of the jaws of each of the clamps, the other axis being common to the opposite jaws of the clamps, means for holding a plurality of glass parts between said axes, means for applying heat to a portion of the glass parts, link connections between the jaws of each pair of clamps whereby a movement of one of the jaws effect a corresponding movement of the opposite jaw, means for heating a portion of the said parts when assembled and means for consolidating the assembled parts.

In testimony whereof, I have hereunto subscribed my name this 3rd day of April, 1924.

JAMES BRYANT WHITMORE.